US010674860B2

(12) United States Patent
Miller et al.

(10) Patent No.: US 10,674,860 B2
(45) Date of Patent: Jun. 9, 2020

(54) SINGLE SERVE BEVERAGE DISPENSER FOR A REFRIGERATOR APPLIANCE

(71) Applicant: Haier US Appliance Solutions, Inc., Wilmington, DE (US)

(72) Inventors: Charles Benjamin Miller, Louisville, KY (US); Christopher Francis Bird, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 842 days.

(21) Appl. No.: 15/203,852

(22) Filed: Jul. 7, 2016

(65) Prior Publication Data
US 2018/0008087 A1  Jan. 11, 2018

(51) Int. Cl.
*A47J 31/40* (2006.01)
*F25D 23/12* (2006.01)

(52) U.S. Cl.
CPC .......... *A47J 31/407* (2013.01); *F25D 23/126* (2013.01)

(58) Field of Classification Search
CPC ............................. A47J 31/407; F25D 23/126
USPC ......................................................... 99/295
See application file for complete search history.

(56) References Cited

U.S. PATENT DOCUMENTS

| 6,606,938 B2 * | 8/2003 | Taylor ................. A47J 31/0642 426/433 |
| 7,997,448 B1 * | 8/2011 | Leyva .................. B67D 1/0044 222/1 |
| 2009/0293530 A1 * | 12/2009 | Van Dillen .......... B67D 1/0014 62/389 |
| 2015/0064324 A1 * | 3/2015 | Oh ..................... B65D 85/8043 426/433 |

FOREIGN PATENT DOCUMENTS

| CN | 103829808 | * | 6/2014 |
| CN | 103829808 A | | 6/2014 |

* cited by examiner

*Primary Examiner* — Dana Ross
*Assistant Examiner* — Joseph Iskra
(74) *Attorney, Agent, or Firm* — Dority & Manning, P.A.

(57) ABSTRACT

A brew module for use with a refrigerator appliance is provided. The brew module includes a brewing body and a pivotally attached lid that together define a brew chamber configured to receive a brew pod. A lower needle is positioned at the bottom of the brew chamber and an upper needle is slidably received within the lid. Pivoting the lid to the closed position forces the lower needle to pierce the brew pod first, thereby relieving any built up pressure. Thereafter, a moving water supply tube drives the upper needle downward to pierce a top cover of the brew pod along a substantially vertical direction, thus minimizing the size of the pierced hole in the top cover. The brew module thus facilitates an improved seal with the brew pod, reduces the risk of clogging the upper needle, and prevents the ejection of brew pod contents.

18 Claims, 12 Drawing Sheets

SINGLE SERVE BEVERAGE DISPENSER FOR A REFRIGERATOR APPLIANCE

FIELD OF THE INVENTION

The present subject matter relates generally to refrigerator appliances, and more particularly to single serve beverage dispensers for use in refrigerator appliances.

BACKGROUND OF THE INVENTION

Refrigerator appliances can include a dispensing assembly for directing ice from the refrigerator's ice maker and/or liquid water to the dispensing assembly. A user can activate the dispensing assembly to direct a flow of ice or liquid water into a cup or other container positioned within the dispensing assembly. Liquid water directed to the dispensing assembly is generally chilled or at an ambient temperature. However, certain refrigerator appliances also include features for dispensing heated liquid water that can be used to make hot beverages, such as coffee or tea.

In some cases, users may desire only a single serving of a hot beverage, and some refrigerator appliances may include a dispensing assembly with features for utilizing single serve brew pods to dispense single serve beverages. For example, a conventional dispensing assembly may include a brew module having a brew chamber for receiving brew pods. Such brew pods typically contain a substance for creating a beverage, such as, e.g., coffee, tea, hot chocolate, lemonade, or the like, when water is passed through the brew pod.

Conventional brew modules include a lower needle positioned in the bottom of the brew chamber and a stationary upper needle extending from a lid which is pivotally attached to the brew module. Each needle defines holes through which liquid may flow. Closing the lid causes the upper and lower needles to pierce the top and bottom of the brew pod, respectively, such that water may flow through the brew pod to create the beverage which is dispensed to the user.

However, as the lid closes on conventional brew modules, the stationary upper needle moves on a circular path with a relatively small radius. The motion of the upper needle tears an oval hole in the top cover of the brew pod, which requires a larger sealing surface. Due to the orientation of the upper needle and the location of the water supply holes in the upper needle, contents of the brew pod may be forced into water supply holes as the needle is inserted into the brew pod.

In addition, the brew pod initially sits on top of the lower needle and is forced down onto the lower needle as the lid is pivoted to the closed position. Therefore, as the lid pivots toward the closed position, the upper needle often pierces the brew pod before the lower needle pierces the brew pod. Notably, brew pods are commonly pressurized. Therefore, when the upper needle pierces the brew pod first, contents of the brew pod may be ejected into the upper needle. In addition, due to the larger oval hole in the top of the brew pod, brew pod contents can also be ejected from the brew module.

Accordingly, a refrigerator appliance that includes improved features for dispensing single serve beverages would be useful. More specifically, single serve beverage dispensing assemblies for refrigerator appliances that improve the seal with the brew pod, reduce the risk of a clogged upper needle, and prevent the ejection of brew pod contents would be particularly beneficial.

BRIEF DESCRIPTION OF THE INVENTION

The present subject matter provides a brew module for use with a refrigerator appliance. The brew module includes a brewing body and a pivotally attached lid that together define a brew chamber configured to receive a brew pod. A lower needle is positioned at the bottom of the brew chamber and an upper needle is slidably received within the lid. Pivoting the lid to the closed position forces the lower needle to pierce the brew pod first, thereby relieving any built up pressure. Thereafter, a moving water supply tube drives the upper needle downward to pierce a top cover of the brew pod along a substantially vertical direction, thus minimizing the size of the pierced hole in the top cover. The brew module thus facilitates an improved seal with the brew pod, reduces the risk of clogging the upper needle, and prevents the ejection of brew pod contents. Additional aspects and advantages of the invention will be set forth in part in the following description, or may be apparent from the description, or may be learned through practice of the invention.

In accordance with one embodiment, a refrigerator appliance defining a vertical direction, a lateral direction, and a transverse direction is provided. The refrigerator appliance includes a cabinet defining a chilled chamber and a door being rotatably hinged to the cabinet to provide selective access to the chilled chamber. The door defines a dispenser recess and a dispensing assembly is positioned within the dispenser recess and includes a moving water delivery tube configured to move substantially along the vertical direction between a retracted position and an extended position. A brew module is removably mounted to the dispensing assembly. The brew module includes a brewing body defining a brew chamber configured to receive a brew pod, the brewing body defining an outlet and including a lower needle. A lid is configured to seal the brew pod within the brew chamber. The lid defines an inlet configured to receive a flow of water from the moving water delivery tube to mix with contents of the brew pod to create a beverage. An upper needle assembly includes an upper needle attached to a drive member, the drive member being slidably received within the lid and configured to move in a vertical direction between a retracted position and an extended position.

In accordance with another embodiment, a beverage dispensing assembly for use with a refrigerator appliance is provided. The refrigerator appliance includes a dispensing assembly including a moving water delivery tube and defines a vertical direction, a lateral direction, and a transverse direction. The beverage dispensing assembly includes a brewing body defining a brew chamber configured to receive a brew pod, the brewing body defining an outlet and comprising a lower needle. A lid is configured to seal the brew pod within the brew chamber, the lid defining an inlet configured to receive a flow of water from the moving water delivery tube to mix with contents of the brew pod to create a beverage. An upper needle assembly includes an upper needle attached to a drive member, the drive member being slidably received within the lid and configured to move in a vertical direction between a retracted position and an extended position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
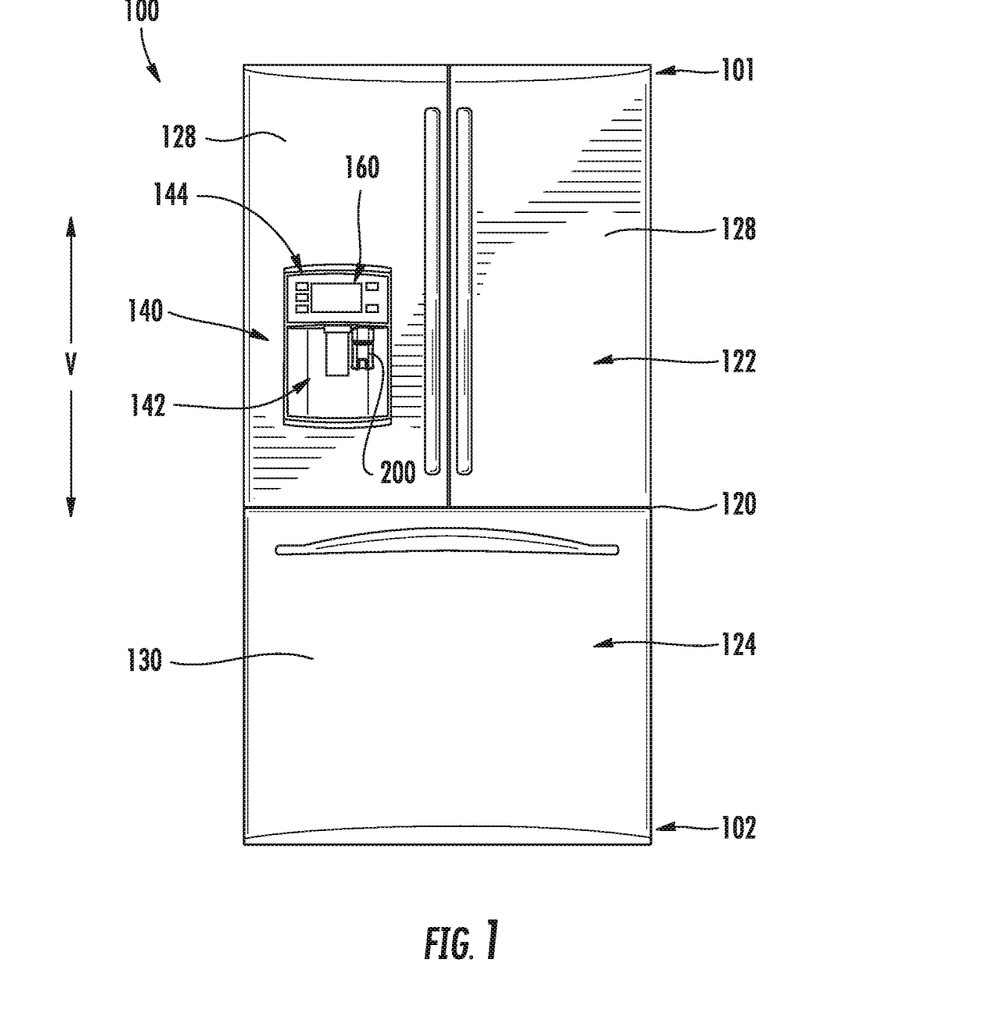
FIG. 1 provides a front, elevation view of a refrigerator appliance according to an exemplary embodiment of the present subject matter.
Figure 2:
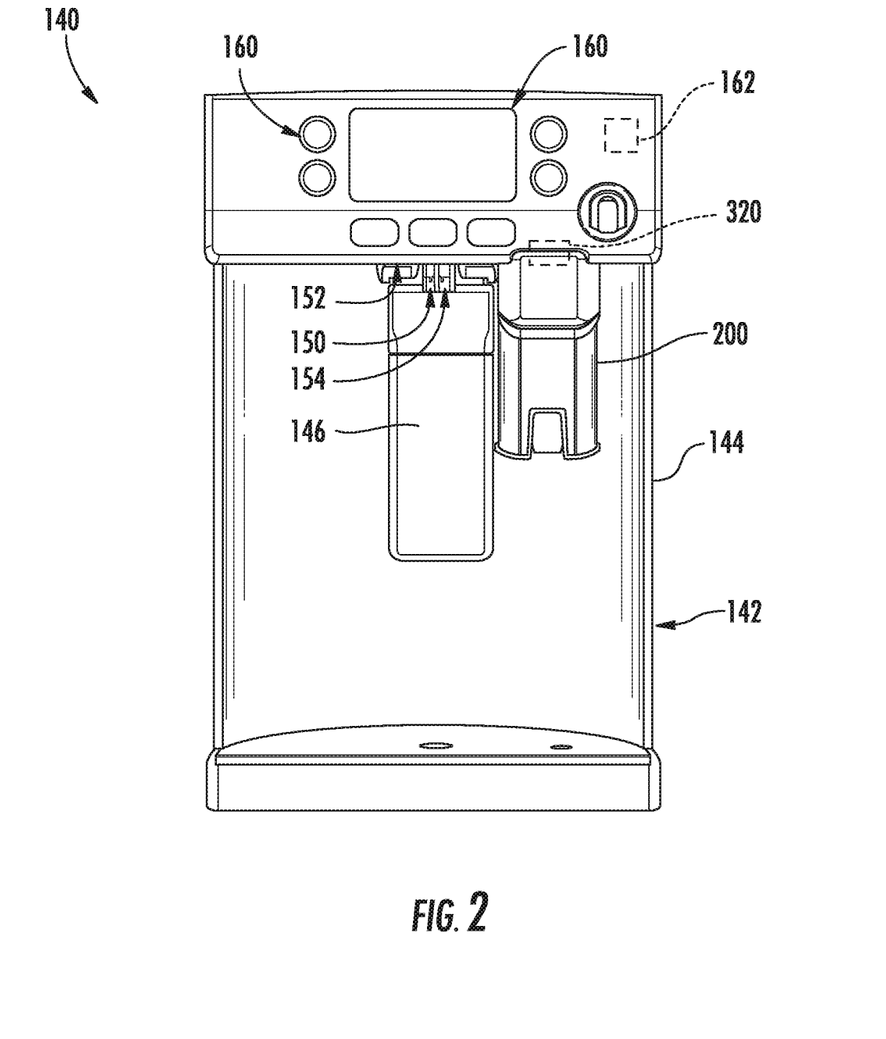
FIG. 2 provides a front, elevation view of a dispensing assembly of the exemplary refrigerator appliance of FIG. 1.

FIG. 1 provides a front, elevation view of a refrigerator appliance 100 according to an exemplary embodiment of the present subject matter. Refrigerator appliance 100 includes a cabinet or housing 120. Housing 120 extends between an upper portion 101 and a lower portion 102 along a vertical direction V. Housing 120 defines chilled chambers, e.g., a fresh food compartment 122 positioned adjacent upper portion 101 of housing 120 and a freezer compartment 124 arranged at lower portion 102 of housing 120. Housing 120 also defines a mechanical compartment (not shown) for receipt of a sealed cooling system for cooling fresh food compartment 122 and freezer compartment 124.

Refrigerator appliance 100 is generally referred to as a bottom-mount refrigerator appliance. However, it should be understood that refrigerator appliance 100 is provided by way of example only. Thus, the present subject matter is not limited to refrigerator appliance 100 and may be utilized in any suitable refrigerator appliance. For example, one of skill in the art will understand that the present subject matter may be used with side-by-side style refrigerator appliances or top-mount refrigerator appliances as well.

Refrigerator doors 128 are rotatably hinged to housing 120 proximate fresh food compartment 122 in order to permit selective access to fresh food compartment 122. A freezer door 130 is arranged below refrigerator doors 128 for accessing freezer compartment 124. Freezer door 130 is mounted to a freezer drawer (not shown) slidably coupled within freezer compartment 124.

Refrigerator appliance 100 may also include a dispensing assembly 140 for dispensing various fluids, such as liquid water and/or ice, to a dispenser recess 142 defined on one of refrigerator doors 128. Dispensing assembly 140 includes a dispenser 144 positioned on an exterior portion of refrigerator appliance 100, for example, within dispenser recess 142. Dispenser 144 includes several outlets for accessing ice, chilled liquid water, and heated liquid water. To access ice, chilled liquid water, and heated liquid water, water-dispensing assembly 140 may for example include a paddle 146 mounted below a chilled water outlet 150, an ice outlet 152, and a heated water outlet 154.

To operate dispensing assembly 140, a user can urge a vessel, such as a cup, against paddle 146 to initiate a flow of chilled liquid water, heated liquid water and/or ice into the vessel within dispenser recess 142. In particular, a control panel or user interface panel 160 may be provided for controlling the mode of operation of dispenser 144, e.g., for selecting chilled liquid water, heated liquid water, crushed ice and/or whole ice. User interface panel 160 can include a chilled water dispensing button (not labeled), an ice-dispensing button (not labeled) and a heated water dispensing button (not labeled) for selecting between chilled liquid water, ice and heated liquid water, respectively. User interface panel 160 may also include a display component, such as a digital or analog display device designed to provide operational feedback to the user.

Outlets 150, 152, and 154 and paddle 146 may be an external part of dispenser 144, and are positioned at or adjacent dispenser recess 142, e.g., a concave portion defined in an outside surface of refrigerator door 128. Dispenser 144 is positioned at a predetermined elevation convenient for a user to access ice or liquid water, e.g., enabling the user to access ice without the need to bend-over and without the need to access freezer compartment 124. In the exemplary embodiment, dispenser 144 is positioned at a level that approximates the chest level of a user.

Operation of the refrigerator appliance 100 can be regulated by a controller 162 that is operatively coupled to user interface panel 160 and/or various sensors as discussed below. User interface panel 160 provides selections for user manipulation of the operation of refrigerator appliance 100 such as e.g., selections between whole or crushed ice, chilled water, and/or other various options. In response to user manipulation of the user interface panel 160 or sensor signals, controller 162 may operate various components of the refrigerator appliance 100. Controller 162 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 162 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 162 may be positioned in a variety of locations throughout refrigerator appliance 100. In the illustrated embodiment, controller 162 is located within the user interface panel 160. In other embodiments, the controller 162 may be positioned at any suitable location within refrigerator appliance 100, such as for example within a fresh food chamber, a freezer door, etc. Input/output ("I/O") signals may be routed between controller 162 and various operational components of refrigerator appliance 100. For example, user interface panel 160 may be in communication with controller 162 via one or more signal lines or shared communication busses.

As illustrated, controller 162 may be in communication with the various components of dispensing assembly 160 and may control operation of the various components. For example, the various valves, switches, etc. may be actuatable based on commands from the controller 162. As discussed, interface panel 160 may additionally be in communication with the controller 162. Thus, the various operations may occur based on user input or automatically through controller 162 instruction.

Refrigerator appliance 100 also includes features for generating heated liquid water and directing such heated liquid water to dispenser 144. Thus, refrigerator appliance 100 need not be connected to a residential hot water heating system in order to supply heated liquid water to dispenser 144. Features of such a water heating assembly (not shown) may include, for example, a variety of water supplies, hot water tanks, heating elements, temperature sensors, and control valves to heat water from a well or municipal water supply, store the heated water, and supply the heated water to dispenser 144.

Dispensing assembly 140 is preferably capable of providing heated water at various temperatures depending on the type of beverage being brewed. For example, when brewing ground coffee, water for brewing is preferably heated to between one hundred and eighty degrees Fahrenheit and one hundred and ninety degrees Fahrenheit. However, according to alternative embodiments, dispensing assembly 140 may be adjusted to provide water for making beverages at any suitable temperature.

Figure 8:
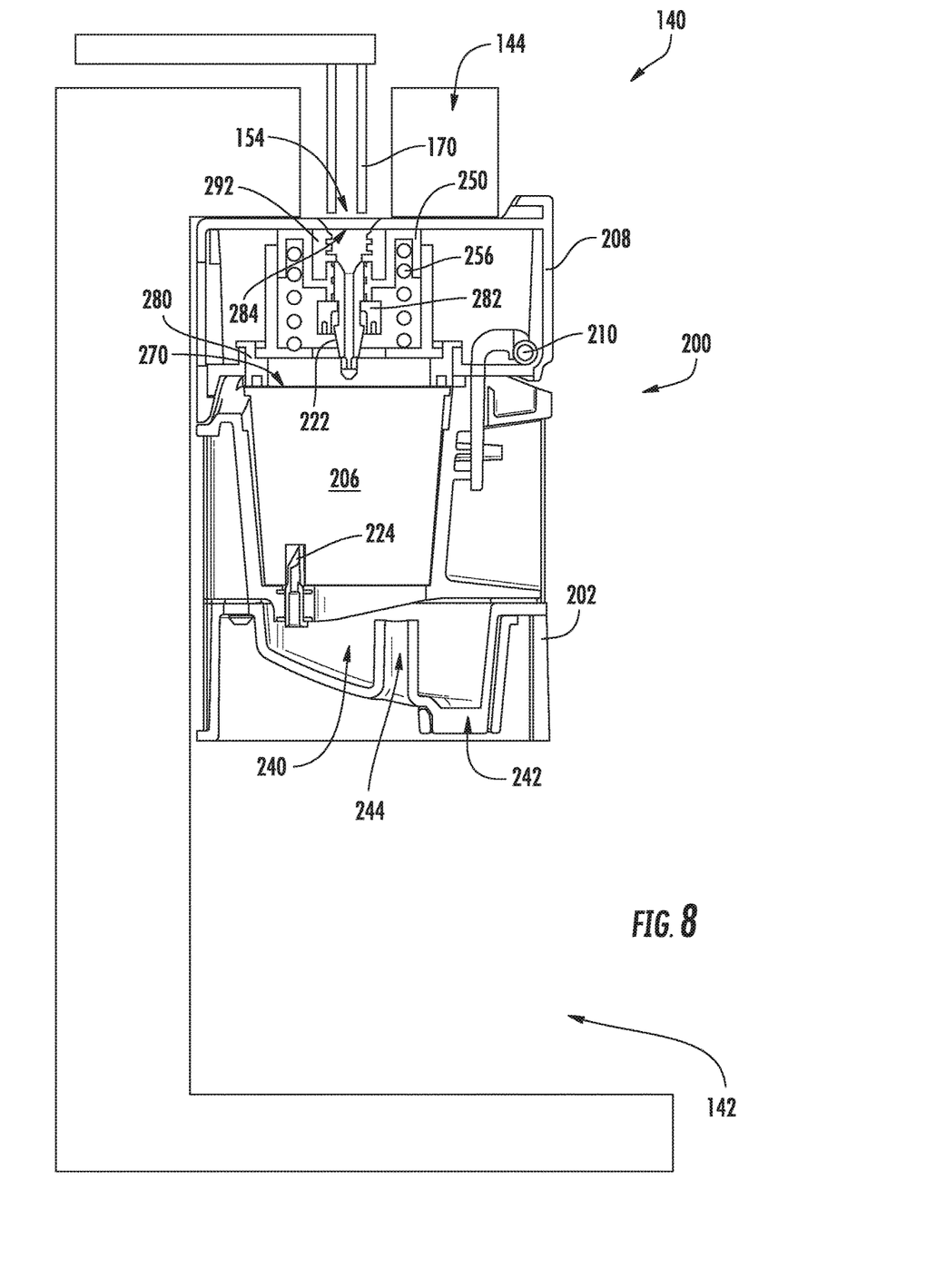
FIG. 8 provides a schematic cross sectional view of the exemplary brew module mounted to the exemplary dispensing assembly of FIG. 2, with the moving water delivery tube shown in the retracted position.
Figure 9:
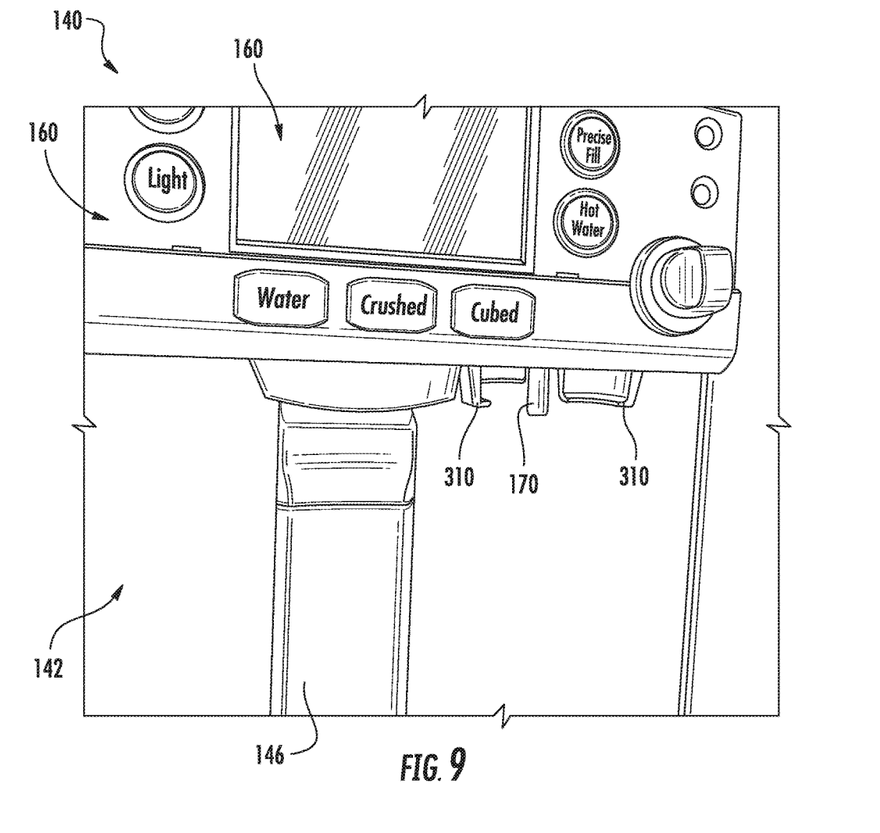
FIG. 9 provides a close-up view of the exemplary dispensing assembly of FIG. 2, with a moving water delivery tube shown in the extended position.
Figure 10:
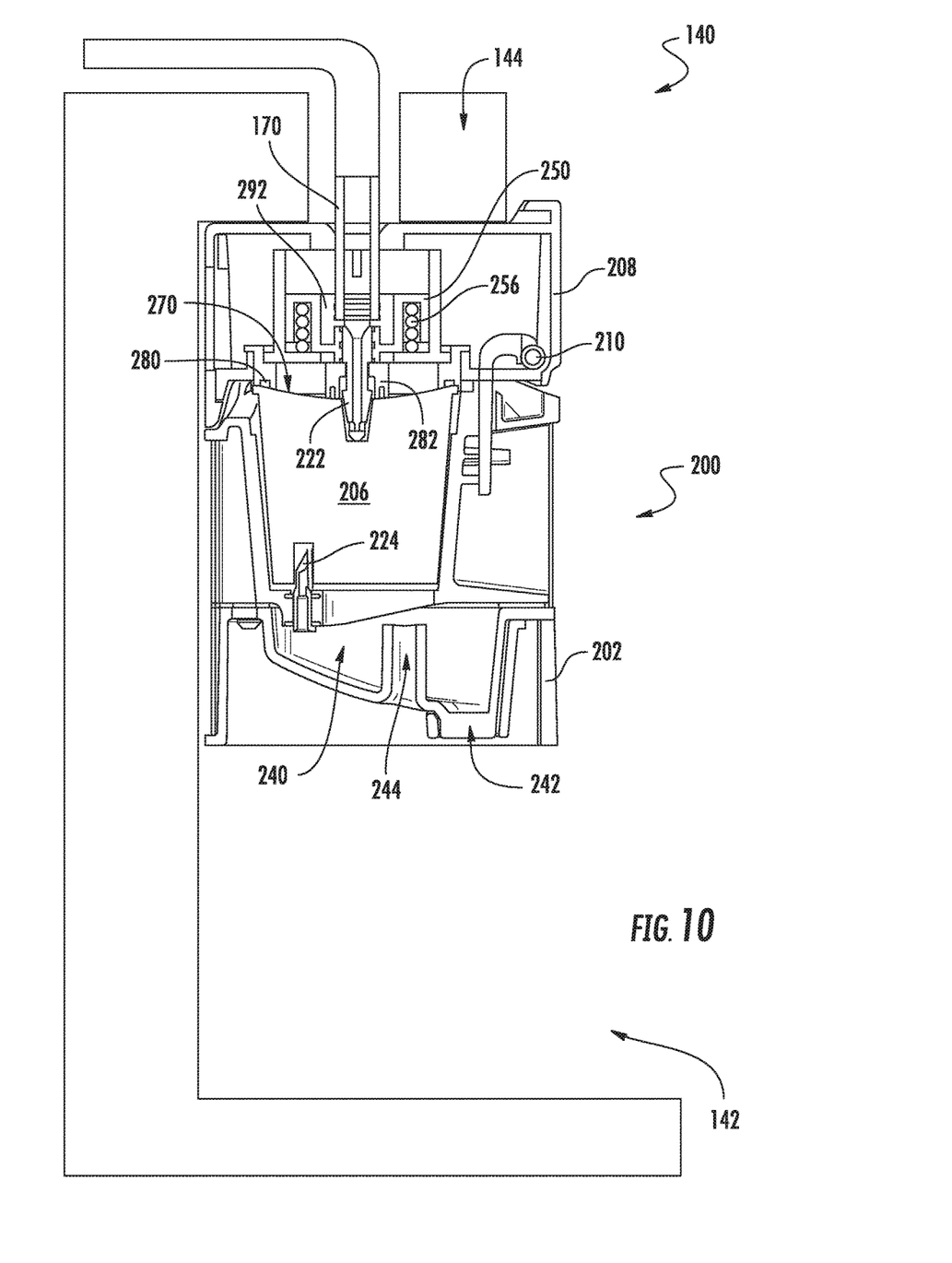
FIG. 10 provides a schematic cross sectional view of the exemplary brew module mounted to the exemplary dispensing assembly of FIG. 2, with the moving water delivery tube shown in the extended position.

As best illustrated in FIGS. 8 through 10, dispensing assembly 140 may include a moving water delivery tube 170 for supplying heated water from the water heating assembly to dispenser 144. Moving water delivery tube 170 may be any suitably rigid conduit or piping that is configured for moving in a substantially vertical direction V. More specifically, moving water delivery tube 170 may extend between a retracted position where it is retracted within dispenser 144 and an extended position where it protrudes downward along the vertical direction V away from dispenser 144 (see, e.g., FIG. 9). According to the illustrated exemplary embodiment, moving water delivery tube 170 is a vertically oriented stainless steel tube that extends into and provides heated water to a brew module, as described in detail below.

Figure 11:
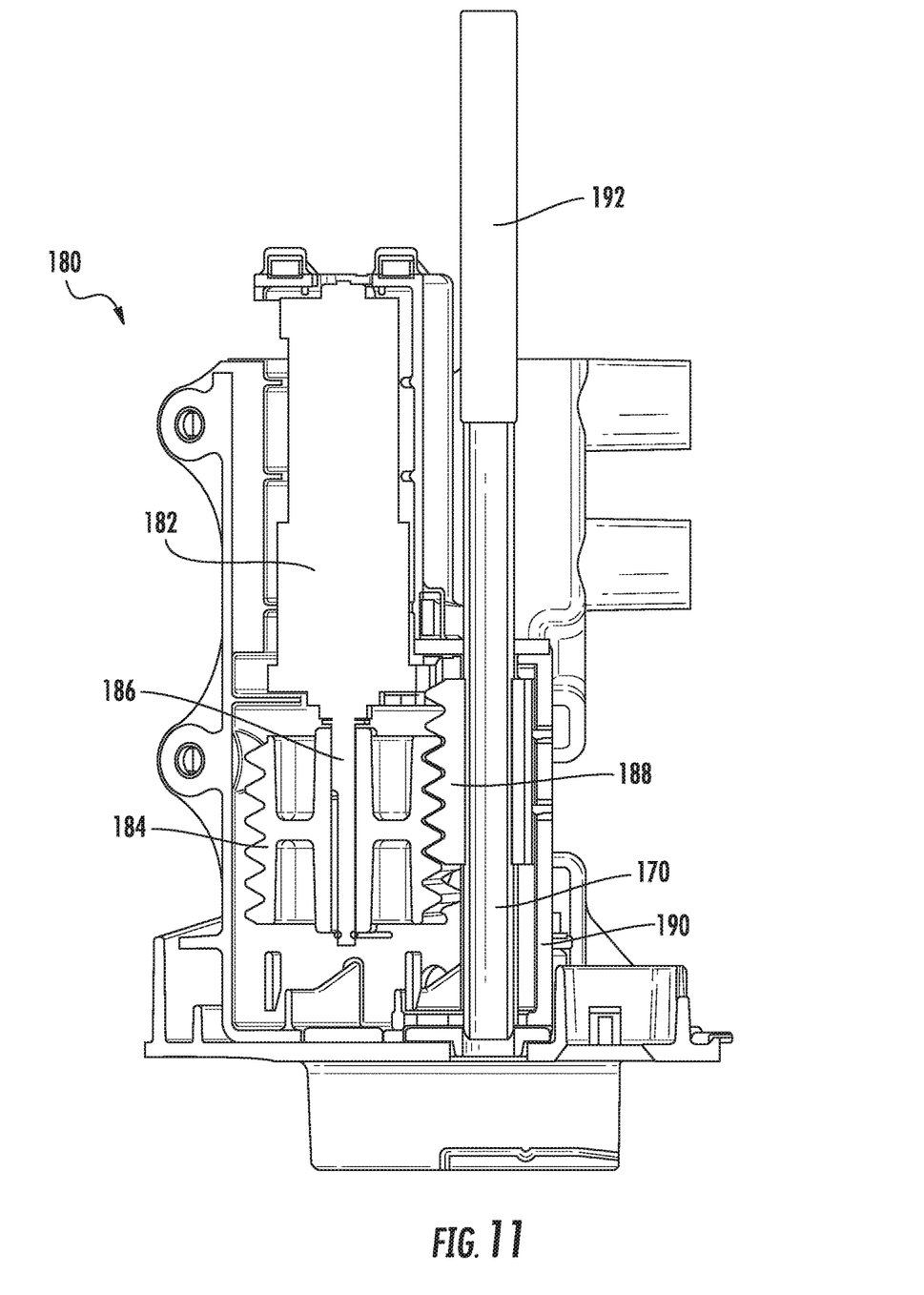
FIG. 11 provides a cross sectional view of a drive assembly which may be used in the exemplary refrigerator appliance of FIG. 1 for extending and retracting a moving water delivery tube according to an exemplary embodiment of the present subject matter.

Referring now briefly to FIG. 11, a drive assembly 180 which is configured for extending and retracting moving water delivery tube 170 will be described. According to the illustrated embodiment, drive assembly 180 includes an electric drive motor 182 that is operably coupled with a worm gear 184 via a shaft 186. A plastic rack gear 188 is molded onto moving water delivery tube 170 and is configured to engage worm gear 184. Worm gear 184 and moving water delivery tube 170 with plastic rack gear 188 are mounted within a drive housing 190. Drive housing 190 is configured for ensuring that worm gear 184 and plastic rack gear 188 remain engaged while allowing moving water delivery tube 170 to move along the vertical direction V. A flexible tube 192 may be fluidly coupled to the rigid moving water delivery tube 170, e.g., for providing hot water from refrigerator appliance 100. An appliance controller, e.g., controller 162, may be configured for selectively operating drive motor 182 to rotate worm gear 184 and extend or retract moving water delivery tube 170. Although drive assembly 180 is described above as comprising an electric motor and a geared rack and pinion arrangement, it should be appreciated that other mechanisms for extending and retracting moving water delivery tube 170 are possible and within the scope of the present subject matter.

Referring now generally to FIGS. 2 through 7, dispensing assembly 140 includes a brew module 200 according to an exemplary embodiment of the present subject matter. Brew module 200 is mountable within dispenser recess 142 such that brew module 200 is in fluid communication with moving water delivery tube 170 when mounted within dispenser recess 142. Thus, heated water from the water heating assembly may flow into brew module 200 via moving water delivery tube 170.

Figure 3:
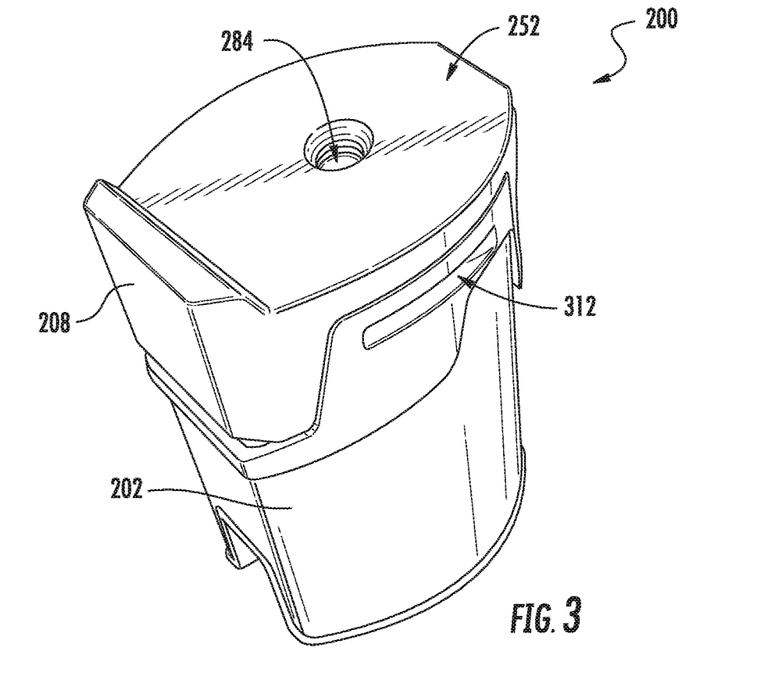
FIG. 3 provides a perspective view of a brew module that may be used with the exemplary dispensing assembly of FIG. 2, with a lid shown in the closed position.
Figure 4:
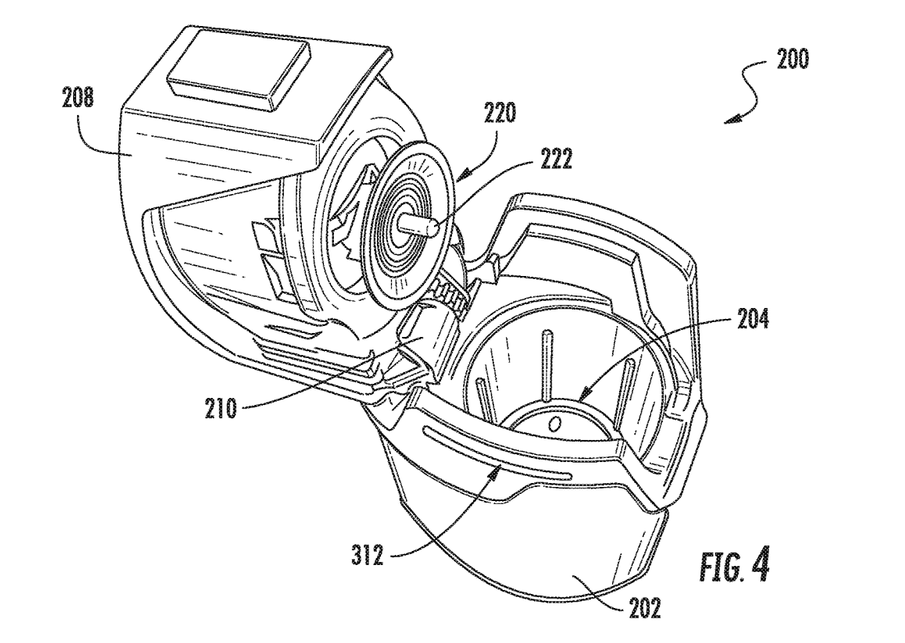
FIG. 4 provides a perspective view of the exemplary brew module of FIG. 3, with the lid shown in the open position.

FIGS. 3 and 4 provide perspective views of brew module 200 in the closed position and the open position, respectively. Brew module 200 may include a body 202 that defines a brew chamber 204. Brew chamber 204 may be a substantially cylindrical chamber that is configured to receive a brew pod 206, as discussed below with respect to FIG. 6. A lid 208 is pivotally attached to body 202 with a hinge 210 to permit selective access to brew chamber 204. More specifically, lid 208 is pivotable between a closed position (FIG. 3) and an open position (FIG. 4).

Figure 5:
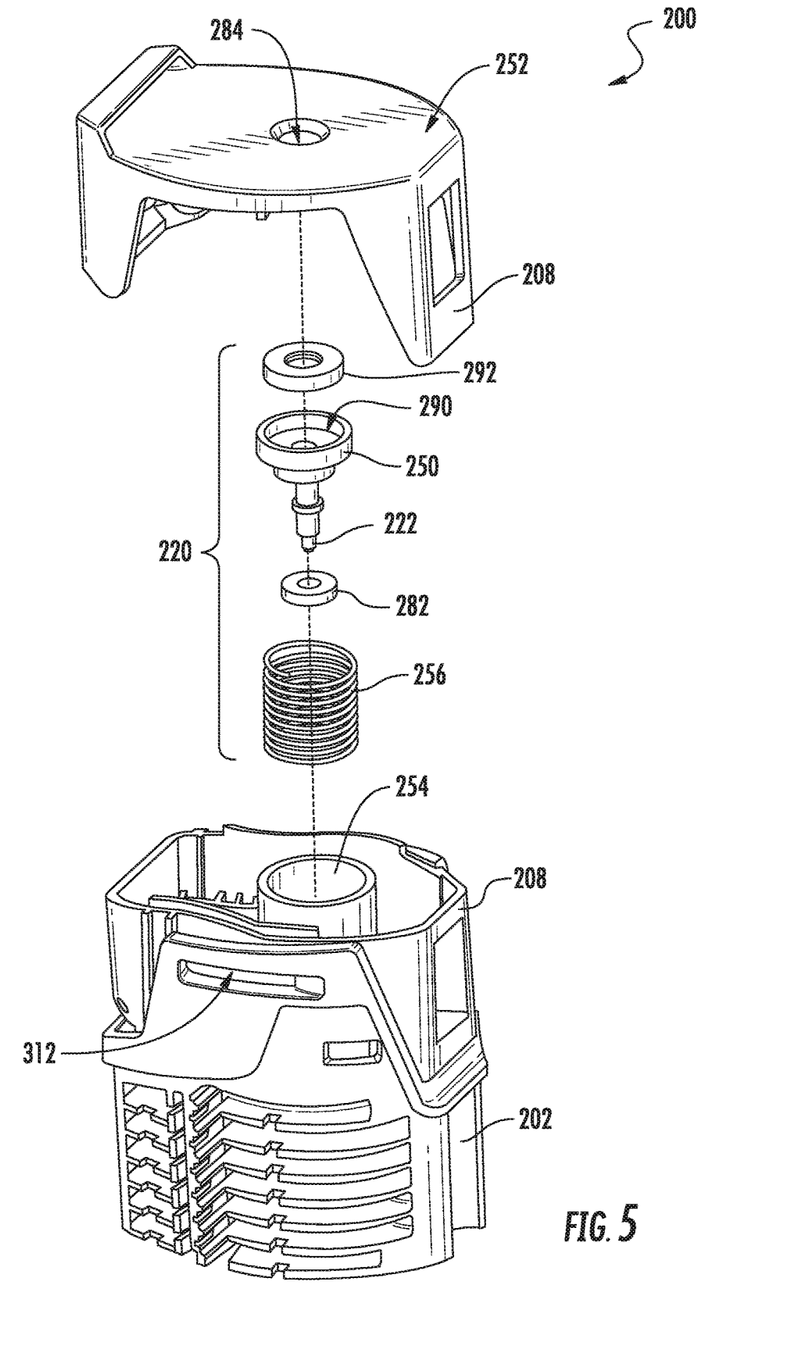
FIG. 5 provides a perspective view of the exemplary brew module of FIG. 3, with the lid exploded for clarity.
Figure 6:
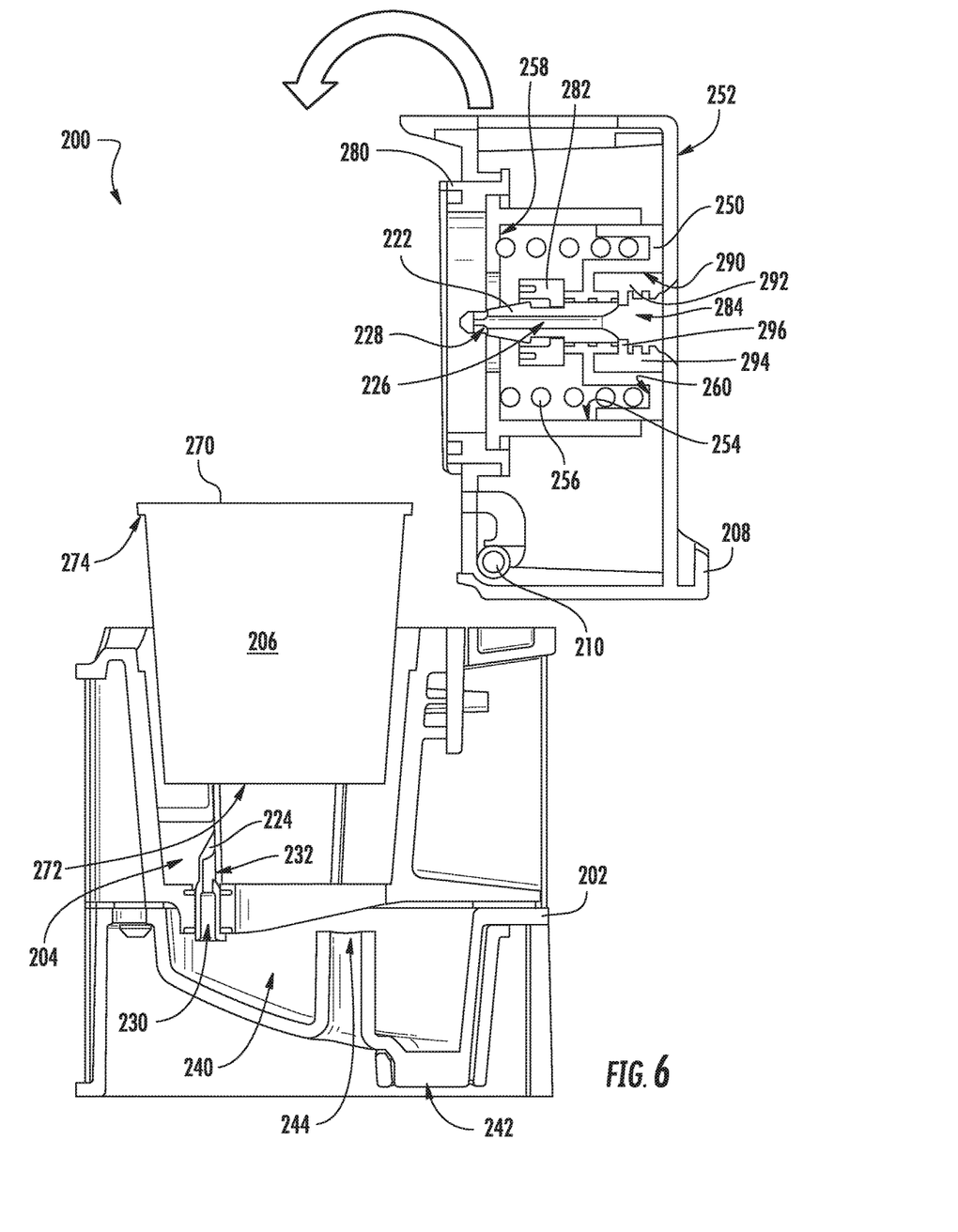
FIG. 6 provides a cross sectional view of the exemplary brew module of FIG. 3, with the lid shown in the open position and a brew pod being inserted.
Figure 7:
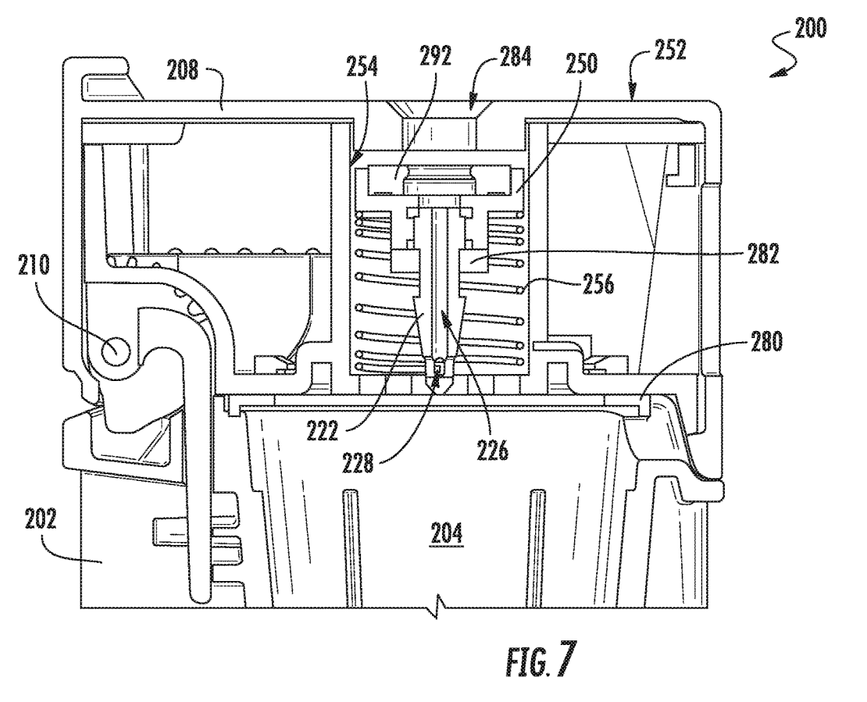
FIG. 7 provides a close-up cross sectional view of the exemplary brew module of FIG. 3, with the lid shown in the closed position.

As shown in FIGS. 5 through 7, brew module 200 includes an upper needle assembly 220, which includes an upper needle 222 positioned proximate a top of brew chamber 204. In addition, brew module 200 includes a lower needle 224 positioned proximate a bottom of brew chamber 204. Needles 222, 224 are each configured for piercing brew pod 206 and may define one or more channels and/or apertures for passing liquid through needles 222, 224. For example, upper needle 222 may define a flow channel 226 and one or more water supply holes 228. As will be described below, flow channel 226 and water supply holes 228 are configured for supplying heated water from moving water delivery tube 170 into brew pod 206 to facilitate the brewing or beverage making process. Similarly, lower needle 224 may define a flow channel 230 and one or more apertures 232 through which liquid may pass out of brew pod 206.

In addition, brew module 200 defines an outlet chamber 240 and an outlet 242 through which beverage may be dispensed from brew module 200. Flow channel 230 and holes 232 of lower needle 224 place brew chamber 204 and outlet chamber 240 in fluid communication such that brewed beverage may drain from brew chamber 204 and flow out of brew module 200. According to the illustrated embodiment, brew module 200 may further include a vent 244 positioned within the outlet chamber 240, for example, to prevent a vacuum from being created within outlet chamber 240 and allow liquid to flow smoothly out of outlet 242.

One skilled in the art will appreciate that brew module 200 is used only for the purpose of explaining certain aspects of the present subject matter. Variations and modifications may be made without departing from the scope of the present subject matter. For example, different chamber configurations may be used, alternative needles geometries are possible, and other changes may be made as well while remaining within the scope of the present subject matter.

Referring now specifically to FIG. 6, upper needle assembly 220 and its interaction with brew pod 206 will be described in more detail. As illustrated, upper needle 222 may be attached to a drive member 250 which is slidably received within lid 208. More specifically, drive member 250 (and thus upper needle 222) is configured to move in a vertical direction V between a retracted position and an extended position when installed on dispenser 144. In other words, drive member 250 is configured to move in a direction substantially perpendicular to a top surface 252 of lid 208.

Drive member 250 may be a cylindrical member that is slidably received in a cylindrical channel 254 defined within lid 208. A mechanical spring 256 may be placed between a bottom lip 258 of cylindrical channel 254 and an annular groove 260 defined by drive member 250. In this manner, mechanical spring 256 urges drive member 250 and upper needle 222 toward a retracted position. More specifically, when drive member 250 is in the retracted position, drive member 250 is in contact with top surface 252 of lid 208 and upper needle 222 is retracted entirely within lid 208. Although drive member 250 is illustrated as being urged toward the retracted position by mechanical spring 256, one skilled in the art will appreciate that other means for retracting upper needle 222 are possible and within the scope of the present subject matter. For example, any suitable resilient member may be used to urge drive member 250 and upper needle 222 toward the retracted position.

Referring still to FIG. 6, a cross sectional view of brew pod 206 being placed in brew module 200 is provided. Brew pod 206 is generally a container which contains or is fillable with a predetermined amount of brewing contents, such as coffee, tea, hot chocolate, lemonade, or the like. The brewing contents are mixed with water to create a beverage that is dispensed to the user. According to some embodiments, brew pod 206 may also include a filter (not shown) positioned within brew pod 206 and configured for filtering brewing contents, such as coffee grounds or tea leaves. Brew pod 206 may be a single-use pod or a reusable pod. A top cover 270 of brew pod 206 may enclose an opening of brew pod 206. Top cover 270 may be pierced, e.g., with upper needle 222. In particular, the top cover 270 may be formed from a suitable foil material, such as aluminum foil, e.g., when brew pod 206 is a single-use pod. Similarly, a bottom 272 of brew pod may be pierced, e.g., with lower needle 224. Brew pod 206 may additionally include a lip 274, which may facilitate placing the brew pod 206 in brew module 200.

As illustrated in FIG. 6, as brew pod 206 is placed in brew chamber 204, it typically sits on top of lower needle 224, i.e., bottom 272 of brew pod 206 is not yet pierced. As best shown in FIG. 8, when lid 208 is pivoted to the closed position, it forces brew pod 206 downward along the vertical direction onto lower needle 224 which pierces bottom 272. Notably, while lid 208 is being closed, upper needle 222 remains in the retracted position, such that top cover 270 of brew pod is not pierced. As described briefly above, by piercing bottom 272 first, any built up pressure within brew pod 206 may be relieved without potentially ejecting contents of brew pod 206 and clogging upper needle 222.

Still referring to FIG. 6, lid 208 may further include an outer seal 280 that extends around and forms a seal with a peripheral edge of top cover 270 of brew pod 206 when lid 208 is in the closed position. According to the exemplary embodiment, outer seal 280 may be a resilient cylindrical gasket that may include one or more ridges for ensuring a proper seal with top cover 270 of brew pod 206. Outer seal 280 ensures that heated water supplied into brew pod 206 does not leak into brew chamber 204.

After lid 208 is closed and brew pod 206 is pierced on bottom 272 by lower needle 224, drive member 250 and upper needle 222 are driven down into top cover 270 of brew pod 206. Notably, because upper needle 222 is moved toward the extended position only after lid 208 is in the closed position, upper needle 222 is vertically oriented, and the pierced hole in top cover 270 is approximately the same diameter as upper needle 222, thus providing at least a partial seal between upper needle 222 and top cover 270.

In addition, as best illustrated in FIG. 10, upper needle assembly 220 may further include an inner seal 282 that is attached to upper needle 222. Similar to outer seal 280, inner seal 282 may extend around upper needle 222 and form a seal with top cover 270 of brew pod 206. Inner seal 282 is placed closer to upper needle 222 and only engages top cover 270 when drive member 250 and upper needle 222 are in the extended position. According to the exemplary embodiment, inner seal 282 may be a resilient cylindrical gasket that may include one or more ridges for ensuring a proper seal with top cover 270 of brew pod 206. Inner seal 282 acts as a redundant, or secondary, seal for ensuing that heated water supplied into brew pod 206 does not leak into brew chamber 204.

According to the exemplary embodiment illustrated in FIGS. 8 through 10, moving water delivery tube 170 is used to provide the driving force necessary to overcome the force of mechanical spring 256 and urge the drive member 250 and upper needle 222 downward to pierce top cover 270 of brew pod 206. As best illustrated in FIG. 8, when brew module 200 is installed in dispenser 144, an inlet 284 defined in top surface 252 of lid 208 is in vertical alignment with the vertically oriented moving water delivery tube 170. Dispenser 144 is configured for extending moving water delivery tube 170 downward along the vertical direction into inlet 284.

As illustrated, drive member 250 defines a cylindrical channel 290 configured to receive an upper seal 292. Upper seal 292 is configured to provide a fluid seal between moving water delivery tube 170 and drive member 250 when moving water delivery tube 170 is in the extended position. According to the illustrated embodiment, upper seal 292 includes a resilient sleeve 294 and a resilient flange 296 that extends inwardly along a radial direction from resilient sleeve 294. In this manner, upper seal 292 forms both a radial seal between a side of moving water delivery tube 170 and resilient sleeve 294 and a face seal between an end of moving water delivery tube 170 and resilient flange 296. One skilled in the art will appreciate that other seal configurations are possible and within the scope of the present subject matter.

Figure 12:
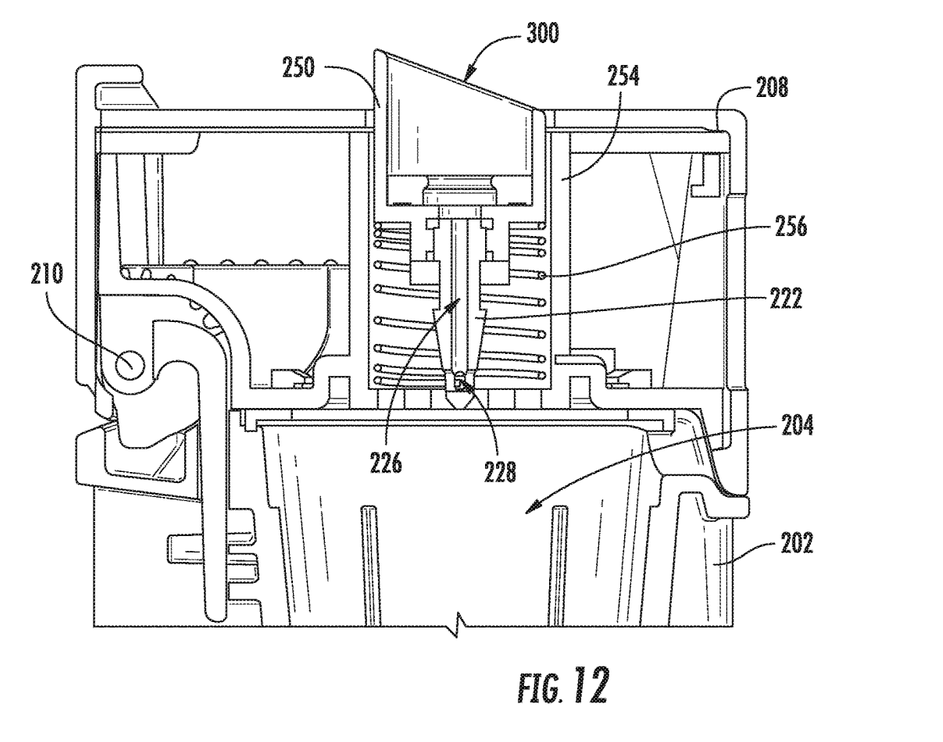
FIG. 12 provides a close-up cross sectional view of an exemplary brew module according to another exemplary embodiment of the present subject matter, with the lid shown in the closed position.
Figure 13:
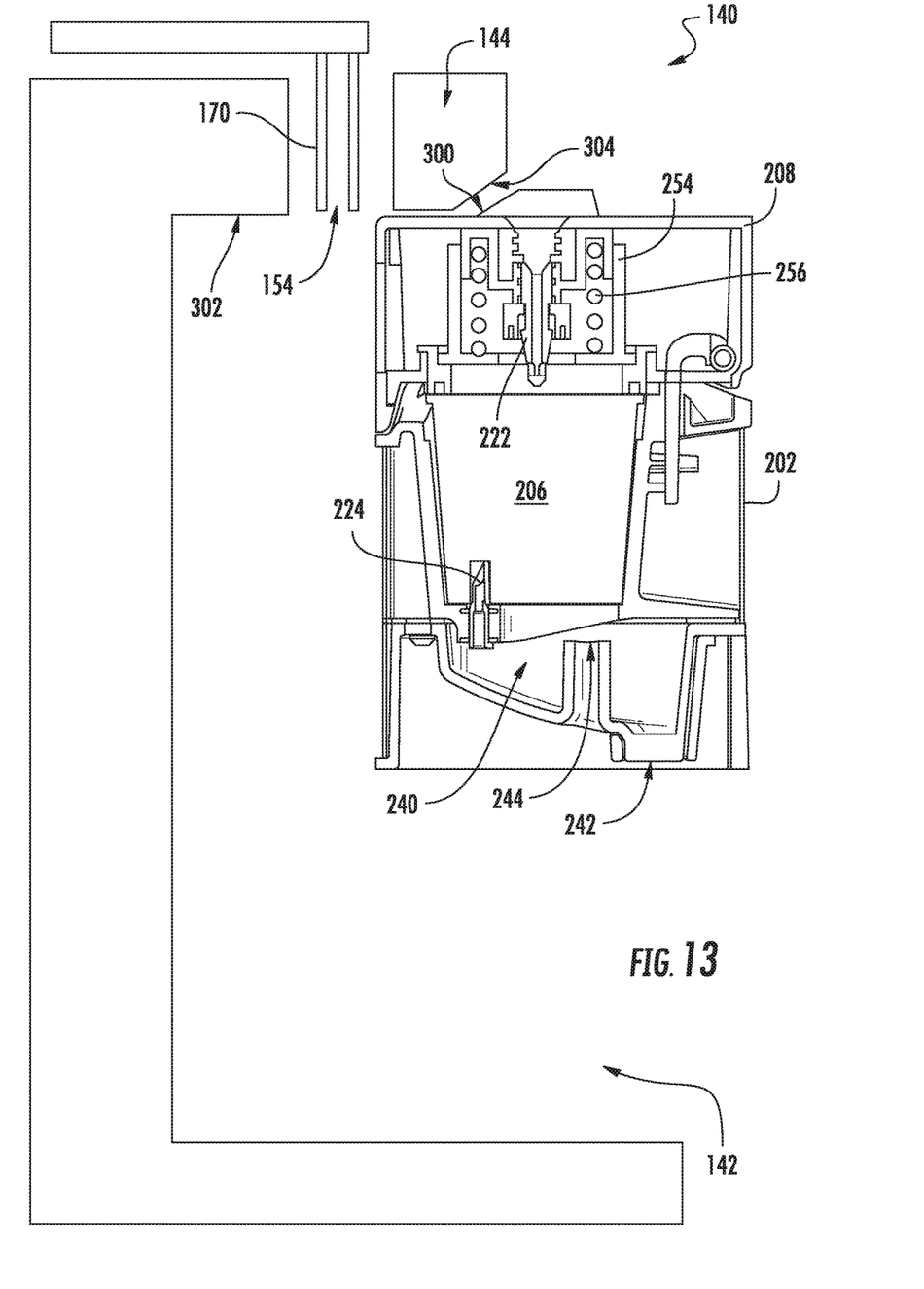
FIG. 13 provides a schematic cross sectional view of the exemplary brew module of FIG. 12 being mounted to a dispensing assembly according to another exemplary embodiment of the present subject matter.

As best illustrated in FIGS. 12 and 13, according to an alternative embodiment of the present subject matter, drive member 250 may be urged toward the extended position using alternate means. For example, drive member 250 may define a first beveled surface 300 that extends upwardly along the vertical direction V from top surface 252 of lid 208 when drive member 250 is in the retracted position (as illustrated). In addition, a bottom surface 302 of dispenser 144 may further define a second beveled surface 304 that is configured to engage first beveled surface 300 when brew module 200 is mounted onto dispenser 144. More specifically, as brew module is installed onto dispenser 144, beveled surfaces 300, 304 engage each other to urge drive member 250 and upper needle 222 downward along the vertical direction, thereby piercing top cover 270 of brew pod 206 in a similar manner as described above. In this manner, moving water delivery tube 170 does not need to exert a force sufficient to urge drive member 250, but instead only needs to move down into engagement with upper seal 292.

Once brew pod 206 is received in brew module 200 and brew module 200 is inserted into dispenser, moving water delivery tube 170 provides heated water into brew pod 206. The heated water may mix with contents within brew pod 206, and the brewed beverage may then flow from brew module 200 into, for example, a container or cup (not shown) typically placed within dispenser recess 142 below brew module 200.

As best shown in FIGS. 3 and 9, dispensing assembly 140 further includes features for mounting brew module 200 to dispenser 144. For example, dispenser 144 may define a plurality of flanges 310 that extend down from dispenser 144 and toward each other. Body 202 of brew module 200 defines corresponding slots 312 on either side that are configured to receive flanges 310. In this manner, a user may slide brew module 200 into engagement with dispenser and flanges 310 may hold brew module 200 in place while dispensing the beverage. Although a slot/flange arrangement is described herein, one skill in the art will appreciate that any suitable means of mounting brew module 200 to dispenser 144 may be used while remaining within the scope of the present subject matter. For example, dispenser 144 may define a tray that is configured to receive and secure brew module 200, different slot and flange configurations are possible, or other mechanical means of securing brew module 200 to dispenser 144 may be used.

Referring back briefly to FIG. 2, dispensing assembly 140 also includes a sensor 320, e.g., positioned proximate dispenser 144. Sensor 320 detects and/or is triggered when brew module 200 is positioned proximate or on sensor 320. Sensor 320 may be any suitable sensor for detecting brew module 200. As an example, sensor 320 may be a plunger switch and/or other suitable mechanical switch that engages brew module 200 (e.g., a surface feature on brew module 200). As another example, sensor 320 may be a Hall effect sensor or magnetic reed switch that is triggered by a magnetic field from brew module 200 (e.g., a magnet on brew module 200). As yet another example, sensor 320 may be a radio frequency identification (RFID) reader that reads an RFID tag on brew module 200. Sensor 320 may be utilized to detect or determine when brew module 200 is mounted within dispenser recess 142.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance defining a vertical direction, a lateral direction, and a transverse direction, the refrigerator appliance comprising:
    a cabinet defining a chilled chamber;
    a door being rotatably hinged to the cabinet to provide selective access to the chilled chamber, the door defining a dispenser recess;
    a dispensing assembly positioned within the dispenser recess and comprising a moving water delivery tube configured to move substantially along the vertical direction between a retracted position and an extended position; and
    a brew module being removably mounted to the dispensing assembly, the brew module comprising:
        a brewing body defining a brew chamber configured to receive a brew pod, the brewing body defining an outlet and comprising a lower needle;
        a lid configured to seal the brew pod within the brew chamber, the lid defining an inlet configured to receive a flow of water from the moving water delivery tube to mix with contents of the brew pod to create a beverage; and
        an upper needle assembly comprising an upper needle attached to a drive member within the brew module, the drive member being slidably received within the lid and configured to move in a vertical direction between a retracted position and an extended position.

2. The refrigerator appliance of claim 1, wherein the moving water delivery tube urges the drive member toward the extended position such that the upper needle pierces a top cover of the brew pod when the moving water delivery tube is moved toward the extended position.

3. The refrigerator appliance of claim 1, wherein the drive member defines a first beveled surface that extends upwardly along the vertical direction from a top surface of the lid when the drive member is in the retracted position, a bottom surface of the dispensing assembly defines a second beveled surface, wherein the first beveled surface and the second beveled surface are configured to engage each other when the brew module is mounted to the dispensing assembly to urge the drive member and the upper needle to pierce the top cover of the brew pod.

4. The refrigerator appliance of claim 1, wherein the lid is pivotally attached to the brewing body, such that pivoting the lid to a closed position presses the brew pod downward along the vertical direction such that the lower needle pierces a bottom surface of the brew pod.

5. The refrigerator appliance of claim 4, wherein the lid further comprises an outer seal that extends around and forms a seal with a peripheral edge of the top cover of the brew pod when the lid is pivoted toward the closed position.

6. The refrigerator appliance of claim 1, wherein the upper needle assembly further comprises a spring positioned between the lid and the drive member, such that the spring urges the drive member and the upper needle upwards along the vertical direction toward the retracted position.

7. The refrigerator appliance of claim 1, wherein the upper needle assembly further comprises an inner seal that is operably coupled to the drive member and surrounds the upper needle, the inner seal forming a fluid seal with the top cover of the brew pod when the drive member is in the extended position.

8. The refrigerator appliance of claim 1, wherein the dispensing assembly comprises a flange and the brew module defines a slot, the slot being configured to receive the flange to secure the brew module to the dispensing assembly.

9. The refrigerator appliance of claim 1, wherein the upper needle assembly further comprises an upper seal, the upper seal being attached to the drive member and being configured to form a fluid seal with the moving water delivery tube.

10. The refrigerator appliance of claim 9, wherein the upper seal comprises a resilient sleeve that receives the moving water delivery tube and forms a face seal with an end of the moving water delivery tube and a radial seal with a side of the moving water delivery tube.

11. The refrigerator appliance of claim 1, wherein the lower needle and the upper needle each define a flow channel through which liquid may flow.

12. A beverage dispensing assembly for use with a refrigerator appliance, the refrigerator appliance comprising a dispensing assembly including a moving water delivery tube, the refrigerator appliance defining a vertical direction, a lateral direction, and a transverse direction, the beverage dispensing assembly comprising:
   a brewing body defining a brew chamber configured to receive a brew pod, the brewing body defining an outlet and comprising a lower needle;
   a lid pivotally attached to the brewing body and being configured to seal the brew pod within the brew chamber, the lid defining an inlet configured to receive a flow of water from the moving water delivery tube to mix with contents of the brew pod to create a beverage, wherein pivoting the lid to a closed position presses the brew pod downward along the vertical direction such that the lower needle pierces a bottom surface of the brew pod and an outer seal extends around and forms a seal with a peripheral edge of the top cover of the brew pod; and
   an upper needle assembly comprising an upper needle attached to a drive member within the brew module, the drive member being slidably received within the lid and configured to move in a vertical direction between a retracted position and an extended position.

13. The beverage dispensing assembly of claim 12, wherein the moving water delivery tube urges the drive member toward the extended position such that the upper needle pierces a top cover of the brew pod.

14. The beverage dispensing assembly of claim 12, wherein the drive member defines a first beveled surface that extends upwardly along the vertical direction from a top surface of the lid when the drive member is in the retracted position, a bottom surface of the dispensing assembly defines a second beveled surface, wherein the first beveled surface and the second beveled surface are configured to engage each other when the lid is mounted to the dispensing assembly to urge the drive member and the upper needle to pierce the top cover of the brew pod.

15. The beverage dispensing assembly of claim 12, wherein the upper needle assembly further comprises a spring positioned between the lid and the drive member, such that the spring urges the drive member and the upper needle upwards along the vertical direction toward the retracted position.

16. The beverage dispensing assembly of claim 12, wherein the upper needle assembly further comprises an inner seal that is operably coupled to the drive member and surrounds the upper needle, the inner seal forming a fluid seal with the top cover of the brew pod when the drive member is in the extended position.

17. The beverage dispensing assembly of claim 12, wherein the dispensing assembly comprises a flange and the lid defines a slot, the slot being configured to receive the flange to secure the lid to the dispensing assembly.

18. The beverage dispensing assembly of claim 12, wherein the upper needle assembly further comprises an upper seal, the upper seal being attached to the drive member and being configured to form a fluid seal with the moving water delivery tube.

* * * * *